INVENTORS
JOSEPH ELBLING
PIERO POMELLA

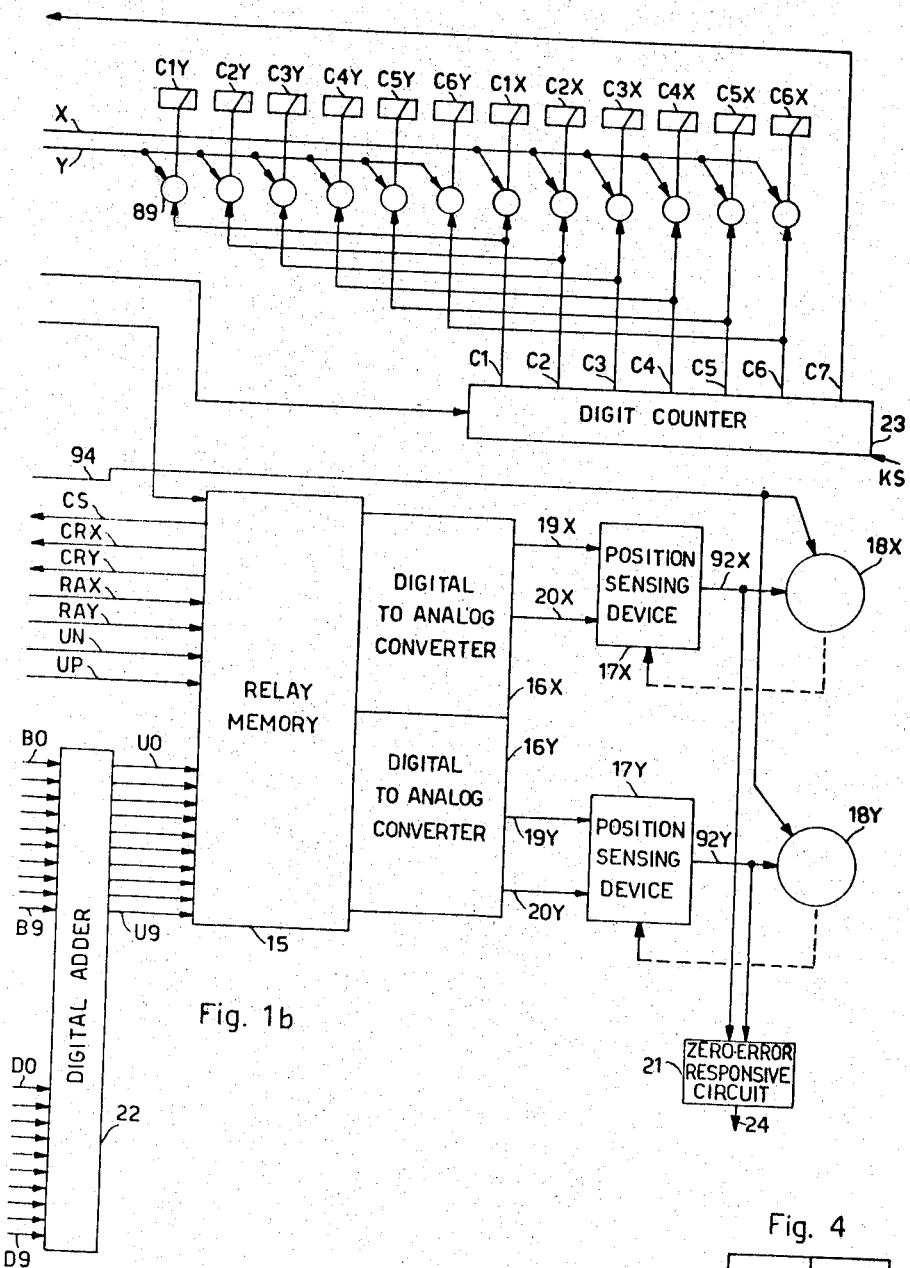
Fig. 1b
Fig. 4
| Fig.1a | Fig.1b |
INVENTORS
JOSEPH ELBLING
PIERO POMELLA
BY 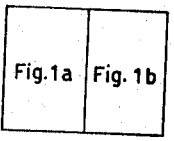
ATTORNEYS

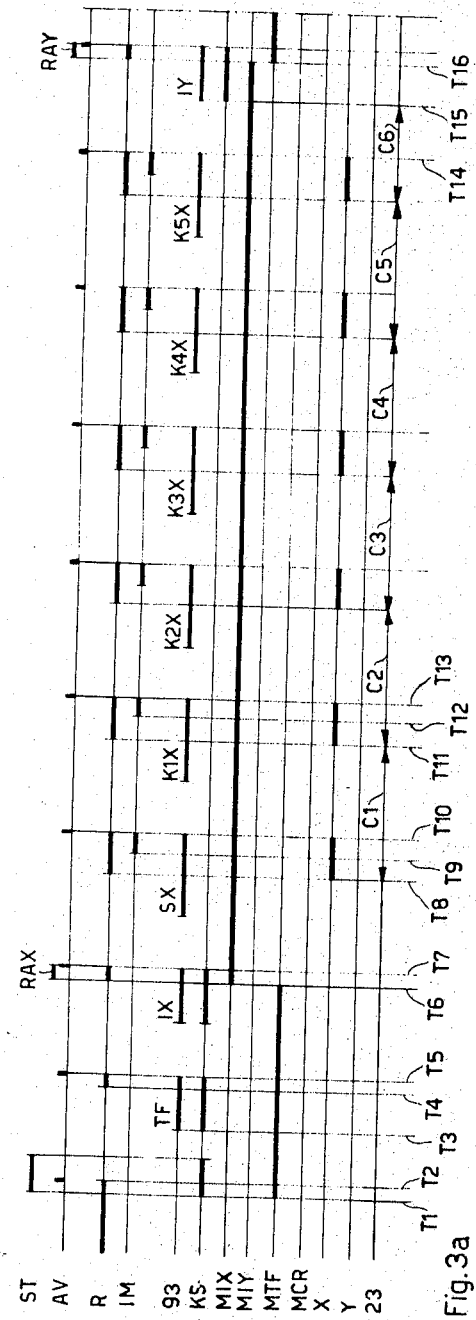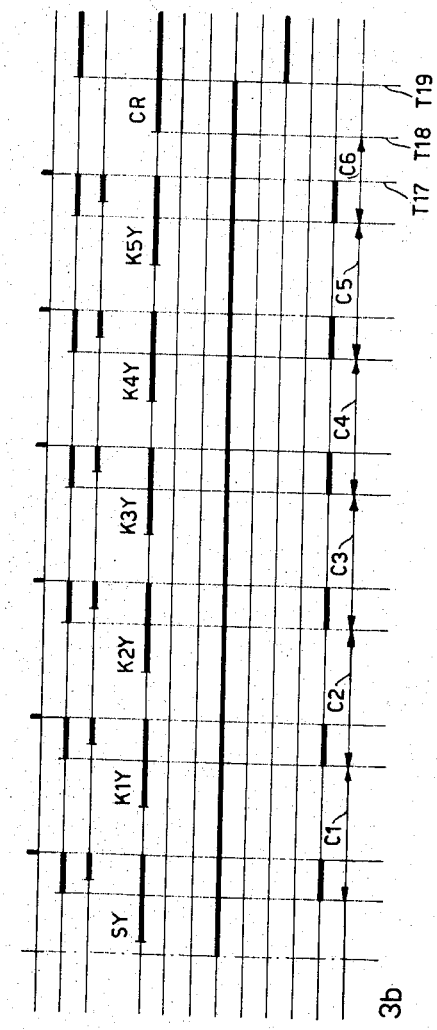

United States Patent Office 3,450,868
Patented June 17, 1969

3,450,868
DIGITAL POSITIONING CONTROL FOR MACHINE-TOOLS EMPLOYING ABSOLUTE AND RELATIVE REFERENCE POINTS
Joseph Elbling and Piero Pomella, Ivrea, Italy, assignors to Ing. C. Olivetti & C., S.p.A., Ivrea, Italy, a corporation of Italy
Filed Mar. 31, 1965, Ser. No. 444,125
Claims priority, application Italy, Apr. 7, 1964, 7,518/64
Int. Cl. G06f 15/46
U.S. Cl. 235—151.11                    2 Claims

ABSTRACT OF THE DISCLOSURE

A digital position control device for machine tools and the like, having a movable part positioned by a servo-system under control of a program unit supplying orders each representing in digital form a position of the movable part with respect to a relative reference point. The servo-system is fed by the order corrected by the addition of a correcting constant in digital form which responds the position of the relative reference point with respect to an absolute reference point.

---

The present invention relates to a digital position control device for machine tools and similar equipments, such as inspection machines and plotting machines, wherein a movable part is positioned by a servo-system under the control of a program unit supplying orders each one representing in digital form a position of said movable part with respect to a relative reference point, said servo-system being fed by said order corrected by the addition of a correcting constant stored in a register and representing in digital form the position of said relative reference point with respect to an absolute reference point.

In a known positioning device said addition is performed by an analog adder comprising a set of transformers inserted between the servomotor and the digital-to-analog converter which feeds the servomotor. This known device, besides being complex in structure and expensive, exhibits insufficient accuracy due to the intrinsic inaccuracy of the analog adder.

Moreover said known device cannot be conveniently used when the servo-system comprises position measuring transformers of the type described in U.S.A. Patent 2,799,835, and requiring the digital-to-analog converter to feed them with two signals proportioned to the sine and cosine respectively of the angular position corresponding to the positional order. As a matter of fact, since the sine and the cosine functions are not linear, the adder to be connected to the output of the digital-to-analog converter would be exceedingly complex.

Moreover, should the position control device be used for point-to-point instead of continuous contouring operation, it may be conveniently provided with a series of position measuring devices having increasing accuracy and successively inserted in the servo loop as the positioning operation proceeds, as described in the U.S.A. Patent 2,950,427. In this case, the aforesaid known device should be provided with a very complex adder inasmuch as it should be able to modify the analog signals feeding all said position measuring devices.

The above disadvantages are obviated in another known position control device, wherein said addition is performed by a digital adder which operates upon magnitudes not yet converted into the analog form.

However, this known device requires a digital-type servo-system in which the positional order and the present position of the movable part are compared in digital form. Therefore said movable part must be provided with position sensing devices having a digital output, which are expensive and delicate. Moreover in this known device the determination of said correcting constant, which requires positioning the movable part in said absolute reference point, is uneasy and unaccurate since in said initial positioning the servo-system is not used.

In fact, in the conventional methods the positioning of the movable part of the machine with respect to the absolute reference point during the preliminary phase is obtained by switching off the servo-system and manually and repeatedly moving the heavy and cumbersome movable part to establish by trial and error the correct reference position.

Moreover, in the known systems the manual setting up and addressing of the data along an axis should be executed at the end of the positioning operation along another axis; i.e. it is not possible to make initially a manual setting up of the data for all the axes, followed by a contemporaneous positioning for all the same axes.

Said disadvantages are obviated in the present invention which provides a digital position control device for machine-tools and similar equipments, wherein a movable part is positioned by a servo-system under the control of a program unit supplying orders each one representing in digital form a position of said movable part with respect to a relative reference point, said servo-system being fed by said order corrected by the addition of a correcting constant stored in a register and representing in digital form the position of said relative reference point with respect to an absolute reference point, characterized in that said addition is performed in a digital adder and that the contents of said register are manually changeable for positioning said movable part by means of said servo-system to coincidence between the absolute and relative reference points in order to determine said correcting constant.

It appears that in the device according to the invention the use of the servo-system for effecting, by trial and error during the preliminary phase, the exact positioning of the movable part with respect to the absolute reference point allows an easy operation.

This and other features, objects and advantages of the invention will clearly appear from the following description of a preferred embodiment thereof, made by way of example and not in a limiting sense, with reference to the accompanying drawings in which:

FIGS. 1a and 1b show a block diagram of the device according to the invention;

FIGS. 3a and 3b show a time diagram of some signals present in the device according to the preceding figures;

FIG. 4 shows how FIGS. 1a and 1b are to be composed;

FIG. 5 shows how FIGS. 3a and 3b are to be composed.

Figure 1A:
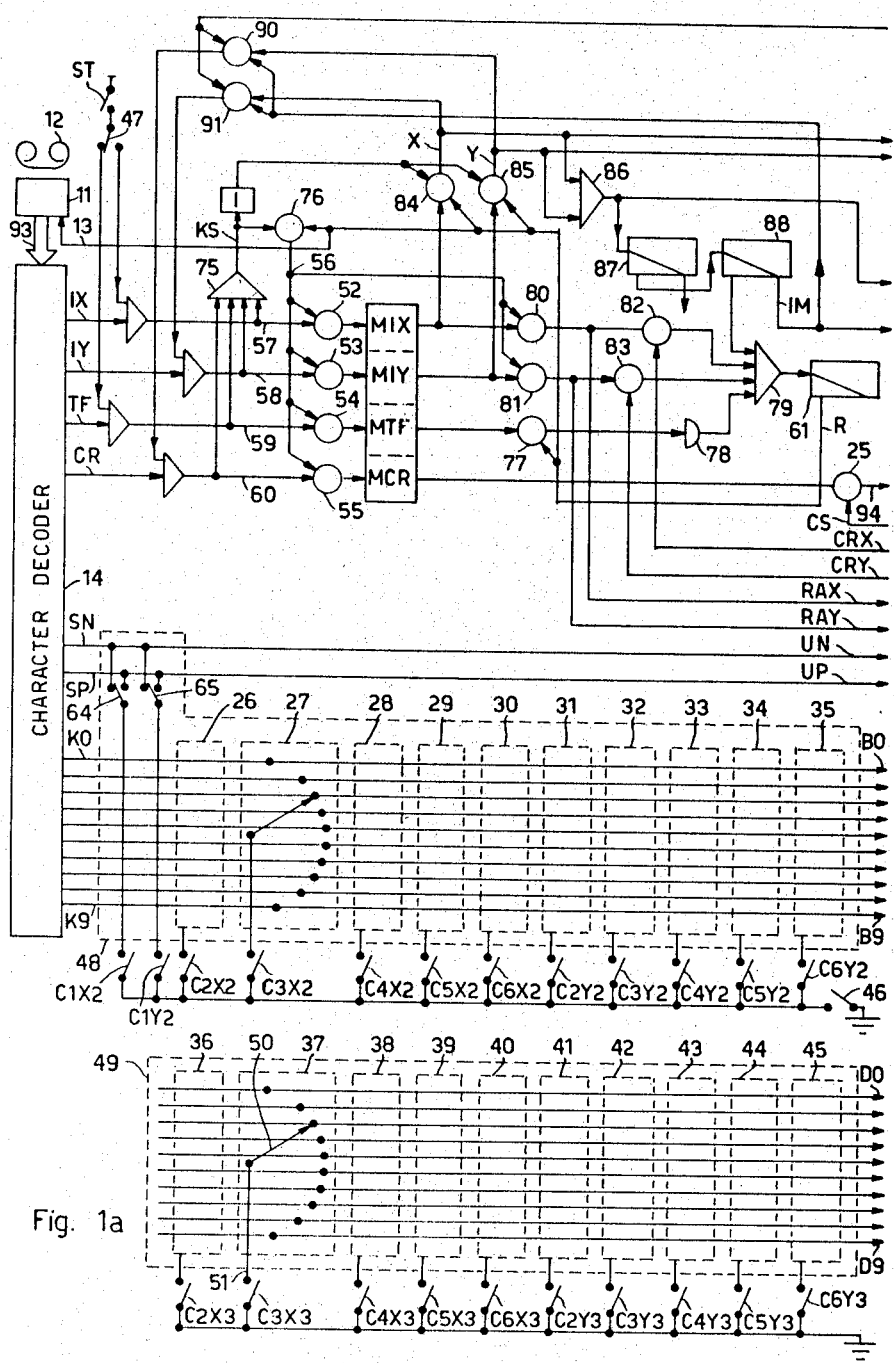

The device shown in FIGS. 1a and 1b, which is adapted for point-to-point operation, comprises a tape reader 11 for reading a tape 12 having punched thereon successive positional orders for controlling the positioning of the movable part of a machine tool along two axes X and Y. More particularly the tape 12 has recorded thereon a plurality of sequences of characters, each sequence being of the type IX–SX–K1X–K2X–K3X–K4X–K5X–IY–SY–K1Y–K2Y–K3Y–K4Y–K5Y–CR, wherein IX and IY are address characters indicating that the next following informations pertain to the axis X, Y respectively; SX and SY are sign characters indicating the algebraic sign of the positional order relating to the axis X, Y respectively; the characters K1X to K5X and K1Y to K5Y represent the five decimal digits of a number which constitutes the positional order relating to the axis X, Y respectively; CR is an end-of-sequence character which, upon being read, causes the machine to be started for executing the order contained in the said sequence.

Before the character CR some characters may be recorded for controlling the auxiliary functions of the machine (spindle speed, lubricant control etc.).

The operation of the position control device comprises a reading phase in which one of the aforesaid sequences of characters is read on the tape 2 and stored and a positioning phase in which the movable part is driven by the servo-system to the position represented by said sequence of characters. In this position the machine performs a certain operation, for instance drilling a hole if the machine tool is a drill; upon completion of this operation, a new reading phase is carried out for reading on the tape the sequence of characters representing the next following position to be reached by the movable part, etc.

The tape reader 11 is apt to stepwise advance the tape 12 for reading the successive characters one at a time. More particularly, when reader 11 is at rest, the tape lies in such a position that a certain character faces the reading transducer of the reader. Upon receiving an advance signal AV on a terminal 13, the reader causes the tape to advance one step and to stop in such a position that the next following character faces the transducer.

The reader 11 feeds a character decoder 14, which is to maintain energized the outputs IX, IY, CR, SN, SP and K0 to K9 according as to whether the character being at present read on the tape is an address character IX or IY, an end-of-sequence character CR, a minus-sign character SN, a plus-sign character SP or a decimal digit 0 to 9 respectively. Moreover the decoder 14 energizes the output TF upon reading on the tape a character having no significance for the position control device. A signal TF is also produced when only the sprocket hole is present on the tape.

The five digits which constitute the positional order pertaining to the axis X and the five digits which constitute the positional order pertaining to the axis Y are stored in a relay memory 15.

The relays of the memory 15 control the contacts of a digital-to-analog converter 16X which controls a servomotor 18X for the axis X through a position sensing device 17X.

Said position sensing device may be of the transformer type, as described for instance in the U.S.A. Patent 2,799,835 and comprising two inductively coupled members movable with respect to each other, each one fastened to one of the machine parts whose relative positions are to be controlled. One member fastened to the fixed part of the machine bears a multi-pole winding, the second member fastened to the movable part of the machine bears two multi-pole windings disposed with respect to each other in space quadrature. It is known that in this case the position of the movable part may be represented by the relative displacement, measured in electric degrees, between said fixed winding and said movable windings. The digital-to-analog converter 16X may be of the type described in U.S.A. Patent 2,849,668 and comprising a network of tapped transformers, wherein a set of contacts controlled by the relays of the memory 15 is able to establish different circuits through the different taps of said transformers for supplying on output 19X a voltage proportional to the sine of the angle representing the value of the positional order pertaining to the axis X and at present staticized in the memory 15X and for supplying on output 20X a voltage proportional to the cosine of said angle.

The position measuring device 17X, whose first and second movable windings are fed by said outputs 19X and 20X respectively, produces on output 92X a signal representing the present position error, that is the difference between the present position of the movable part and the position represented by the positional order, said error signal being used to feed the servomotor 18X.

The contacts of the relays of the memory 15 control in a similar manner a digital-to-analog converter 16Y, which controls a servomotor 18Y for the axis Y through a position sensing device 17Y.

From the foregoing it is apparent that the positional orders stored in the memory 15 must equal to the coordinates along axes X and Y, digitally expressed in electric degrees, of the position to which the movable part is to be brought, the origin of the coordinates being established in the position wherein in the position sensing devices 17X and 17Y the fixed windings are in phase agreement with respect to the respective first movable windings. This position having coordinates equal to zero (absolute reference point) is fixed with respect to the machine tool. On the contrary, the positional orders recorded on the tape 12 represent the coordinates along axes X and Y of the point to which the movable part must be brought, measured with respect to a reference point (relative zero) which, for sake of simplicity in programming, does not generally coincide with the absolute reference point of the machine tool.

Therefore the relative coordinates read on the tape are fed to a digital adder 22, wherein they are added to the absolute coordinates of the relative zero point, which have been previously set up in a register comprising a group of ten manually-operable switches 49. Adder 22 supplies on the outputs U0 to U9 the corrected or absolute coordinates which are then stored in the relay memory 15 for controlling the servomotors.

The group of manually-operable switches 49 comprises five ten-position switches 36 to 40, among which only the switch 37 is shown in detail in FIG. 1a. The five decimal digits of the coordinate of the relative zero point along axis X are set up on said five switches 36 to 40 respectively. Moreover the group 49 comprises five ten-position switches 41 to 45 for setting up the five decimal digits of the coordinate of the relative zero point along axis Y.

The movable arm 50 of each switch may selectively connect one out of ten bars D0 to D9 to the common terminal 51 of the switch itself. The ten bars D0 to D9, which feed the adder 22 and correspond to the decimal digits 0 to 9 respectively, are common to all the switches of the group 49.

The switches 36 to 45 of the group 49 are selected one at a time by connecting to ground their common terminal 51 via a contact C2X3, C3X3, C4X3, C5X3, C6X3, C2Y3, C3Y3, C4Y3, C5Y3 and C6Y3 respectively.

To this end said contacts are controlled by corresponding relays C2X, C3X, C4X, C5X, C6X, C2Y, C3Y, C4Y, C5Y, C6Y, which are sequentially energized by a digit counter 23, as explained later on.

Therefore it is apparent that, when one of said ten position switches is selected by the corresponding relay, the ground terminal is connected to that bar among the bars D0 to D9 which is connected to the movable contact 50 of said switch, that is, to the bar corresponding to the decimal digit set up on said switch. Bearing in mind that the binary signals present on a certain line have the value 1 or 0 depending on whether said line is at 0 v. or —20 v. potential, it is apparent that in aforesaid case the bar D0 to D9 corresponding to the set up digit is energized to the binary level 1. The signals IX, IY, TF, CR produced by the decoder 14 upon reading the corresponding characters IX, IY, TF, CR on the tape are staticized in four binary memories MIX, MIY, MTF, MCR. More particularly these memories are such that, upon opening the gates 52, 53, 54, 55 by energizing the line 56, the binary signal present on the inputs 57, 58, 59 and 60 respectively is stored into said memories respectively. Bearing in mind that the outputs IX, IY, TF, CR of the decoder 14 are energized one at a time inasmuch as they correspond to different characters, it is thus apparent that one and only one out of the outputs of the four memories MIX, MIY, MTF, MCR is energized.

Upon reading one of the characters IX, IY, TF, CR, which will thereafter be called special characters to distinguish over digital characters and algebraic sign characters, a signal KS is produced on the output of an "or" gate 75 for indicating that the character being now read is just a special character.

According to the invention, the positional orders may be entered into the position control device also manually, by setting up their digits on a group of ten-position switches 48, instead of automatically by reading tape 12.

The group of switches 48, whose structure is similar to the structure of the group 49 previously described, comprises common bars B0 to B9 corresponding to the decimal digits 0 to 9 connected at one end to the outputs K0 to K9 of the decoder 14 and at the other end to the adder 22. The first five switches 26 to 30 of the group 48 are used to set up the five digits respectively of the positional orders (relative coordinate) pertaining to axis X, while the remaining five switches 31 to 35 are similarly allotted to the axis Y. When the tape reader 11 is operative, the signals read on the tape are transmitted to the adder 22. Under these conditions, the switch 46 controlled by a knob for manually selecting between manual and automatic mode of operation, is opened as shown in FIG. 1a, whereby no signal may be transmitted to the adder 22 from the manually operable switches 26 to 35. On the contrary, during the manual operation, contact 46 is closed, whereby, while reader 11 remains inoperative, the switches 26 to 35 are sequentially selected by closing the respective contacts C2X2, C3X2, C4X2, C5X2, C6X2, C2Y2, C3Y2, C4Y2, C5Y2, C6Y2, these contacts being closed by the electromagnets C2X, C3X, C4X, C5X, C6X, C2Y, C3Y, C4Y, C5Y, C6Y which are sequentially energized by the digit counter 23. Therefore in the manual operation the adder 22 is successively fed first with the five digits of the positional order pertaining to the axis X, then with the five digits of the positional order pertaining to the axis Y.

The relay memory 15 comprises (FIG. 2) a setting matrix 62X for axis X, a setting matrix 62Y for axis Y, a storage matrix 63Y for axis Y and a storage matrix 63X for axis X.

Each one of said four matrices comprises twelve rows and six columns. In each matrix the twelve rows correspond, from top to bottom, to negative sign SN, positive sign SP, and decimal digits 0 to 9 respectively, whereas the six columns correspond, from left to right, to the algebraic sign and to the five decimal denominations of the positional order. More particularly in the setting matrices 62X and 62Y each one of the twelve rows comprises an input conductor EUN, EUP, and EU0 to EU9 respectively, each conductor being common to the two matrices 62X and 62Y and being adapted to be grounded via a corresponding setting contact NN, NP and N0 to N9 and via a common contact MS.

The setting contacts NN, NP and N0 to N9 are controlled, through a corresponding plurality of electromagnets, by the signals present on input lines UN, UP and U0 to U9 of the matrix, said signals representing the negative sign, the positive sign and the decimal digits 0 to 9 respectively. The input lines U0 to U9 are fed by the adder 22, while the input lines UN and UP are fed either by the outputs SN, SP respectively of the decoder 14 in the automatic operation or by the two-position switches 64 or 65 in the manual operation.

Moreover, in the setting matrices 62X and 62Y each one of the six columns is made of a selecting conductor adapted to be connected to the terminal 66 via a corresponding selecting contact C1X1, C2X1, C3X1, C4X1, C5X1, C6X1, C1Y1, C2Y1, C3Y1, C4Y1, C5Y1, C6Y1 respectively. As explained later on, these contacts are sequentially closed by relays C1X to C6X and C1Y to C6Y controlled by the digit counter 23.

Figure 2:
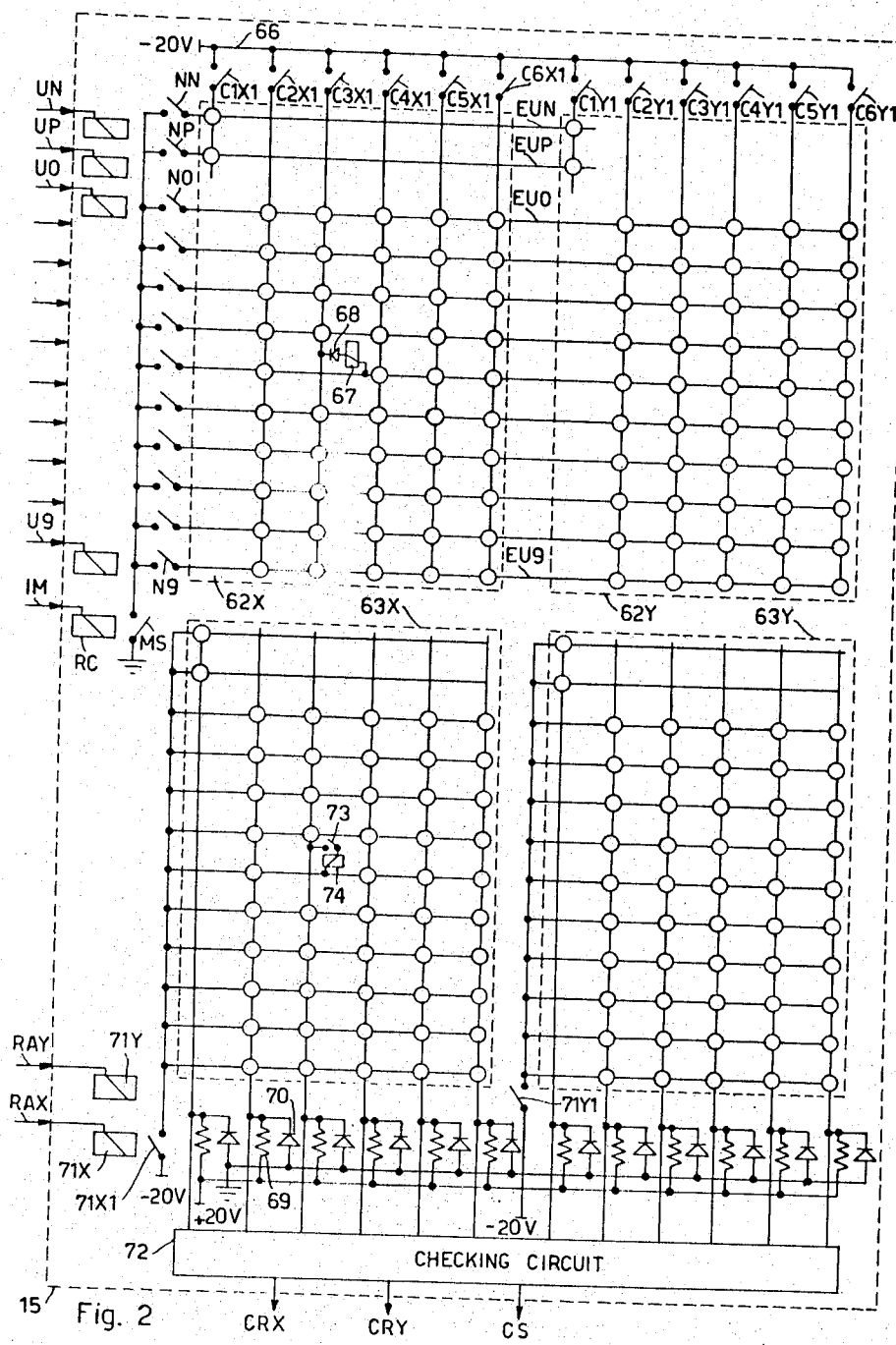
FIG. 2 shows a relay memory used in the device according to FIGS. 1a and 1b.

In the matrices 62X and 62Y, in each one of the crossing points marked by a small circle in FIG. 2, the row and the column crossing each other therein are connected through a separating diode 68 and the winding of a setting relay 67. Therefore it is apparent that, upon selecting a column, the energization of one of the input lines UN, UP and U0 to U9 causes the setting relay located at the point where said columns crosses the row corresponding to said input line to be energized.

Said energization of the setting relay is actually performed only if a signal IM is present for closing the normally open contact MS through relay RC.

In the storage matrices 63X and 63Y each column comprises a conductor connected to ground potential via a diode 70, to +20 v. potential via a resistor 69 and directly to a checking circuit 72. Moreover in the matrices 63X and 63Y each row comprises a conductor which is connected to −20 v. potential via a normally closed contact 71X1 and 71Y1 respectively. In the matrices 63X and 63Y in each one of the crossing points marked by a small circle in FIG. 2, the row and the column crossing each other therein may be connected via a contact 73 and the winding of a storage relay 74. Contact 73 is closed upon energizing the relay 67 of the corresponding row and of the corresponding column of the setting matrix 62X or 62Y. Therefore the storage relay 74 is then energized, and thereafter it continues to keep the contact 73 closed and thus to maintain itself energized until a reset signal RAX or RAY is fed to energize the relay 71X or 71Y to open the contact 71X1 or 71Y1 respectively for cancelling the storage matrix 63X or 63Y respectively.

Moreover, relay 74 when energized closes corresponding contacts in the digital-to-analog converter 16X or 16Y.

The checking circuit 72 is apt to indicate by producing a signal CRX, CRY respectively whether all the columns of the storage matrices 63X or 63Y respectively are simultaneously at +20 v. potential, and to indicate, by producing a signal CS, whether all columns of both matrices 63X and 63Y are simultaneously of 0 v. potential. Therefore it is apparent that presence of signal CRX, CRY, CS indicates that in the matrix 63X no relay is energized, that in the matrix 63Y no relay is energized and that in both matrices 63X and 63Y all the columns have at least one storage relay energized, respectively; that is, respectively, that the matrix 63X is cancelled, that the matrix 63Y is cancelled and that in both matrices 63X and 63Y the setting up of the digits has been completed.

The automatic operation of the device according to the invention will now be briefly described with reference to the time diagram of FIG. 3.

The operator sets up on the switches of the group 49 the absolute coordinates of the relative zero point.

Thereafter (instant T1) the operator pushes the start button ST. As a consequence, via switch 47 a signal is sent on line 59. Therefore the output of the "or" gate 75 is energized, whereby, since the output R of the monostable circuit 61 at present is energized, also the output 56 of the "and" circuit 76 is energized. Thus gate 54 is opened and said signal is stored in the memory MTF.

Via "and" gate 77 and "or" gate 79, and with a slight delay produced by the delay element 78, the output R of the monostable circuit 61 is therefore deenergized (instant T2). The trailing edge of signal R acts through input 13 of reader 11 as an advance signal AV for the tape 12, whereby the tape advances one step to bring the first character under the reader 11. Therefore (instant T3) the first character, which is assumed to be the character TF, begins to be available on the output 93 of the reader 11. The inherent delay of the monostable circuit 61 is such that it reverts to the normal state, that is, reenergizes output R, after said character read by the reader is made available on the output TF of decoder 14.

More particularly, as soon as the signal R has been reestablished (instant T4), the output 56 of the "and" gate 76 is energized, whereby gate 54 is opened and said character signal TF is stored in the memory MTF. Via "and" gate 77, delay element 78 and "or" circuit 79 the output R of the monostable circuit 61 is deenergized once more( instant T5). Therefore the trailing edge of the signal R produces once more via the input 13 of the reader 11 an advance signal AV for the tape 12, whereby the tape advances one step and stops on the second character, which is assumed to be the address character IX of the first order relating to axis X.

When (instant T6) the monostable circuit 61 reverts the normal state, it reestablishes signal R, which energizes output 56 of the "or" gate 76, since the output KS of the "or" gate 75 is in the meantime energized because the character being now read is a special character, whereby, gate 52 being opened, the character signal IX is stored in the memory MIX.

Therefore, via "and" circuit 80 the input line RAX of the relay memory 15 is energized. The signal RAX, by energizing the relay 71X (FIG. 2), causes the storage matrix 63X pertaining to the axis X to be cancelled. As soon as the checking circuit 72 of the memory 15 produces the signal CRX indicating that said cancellation has been completely performed, gate 82 is opened, whereby said signal IX stored in the memory MIX is sent to deenergize the output R of the monostable circuit 61. Therefore (instant T7) on input 13 of reader 11 an advance signal AV for the tape 12 is produced, whereby the tape advances one step to bring under the reader the next following character, which, as already stated, will be the sign character of the positional order pertaining to the axis X. Reading said sign character causes either the output SP or SN of the decoder 14, and thus either the input UP or UN of the memory 15, to be energized, depending on whether the sign itself is positive or negative, whereby in the memory 15 either the contact NP or NN respectively is closed.

Since the character being now read is not a special character, signal KS is absent on the output of the "or" gate 75, whereby, as the gates 52, 53, 54, 55 remain closed, the contents of the binary memories MIX, MIY, MTF, MCR is not modified. Therefore until reading the next following special character, which will be IY, only the output of the memory MIX will remain energized.

When (instant T8) the monostable circuit 61 reverts to the normal state, a signal X is thus produced on the output of the "and" gate 84. Via the "or" gate 86 said signal X is fed to the digit counter 23, which therefore advances one step, whereby from said signal X until the next following signal X the output C1 remains energized to energize relay C1X via "and" gate 89. As a consequence, contact C1X1 is closed for selecting the first column of the relay matrix 62X. Moreover said signal X starts a chain of monostable circuits 87, 88. The signal IM produced by the monostable circuit 88 is fed (instant T9) to the memory 15 to energize relay RC so as to close contact MS for allowing the relays of the setting matrix 62X to be energized. More particularly, as the first column of the matrix is selected, either the relay of the first row or relay of the second row is energized depending on whether the algebraic sign of the positional order pertaining to the axis X is negative or positive. Therefore also the relay belonging to the first column and to either the first or the second row respectively is energized in the storage matrix 63X. At the end of the signal IM (instant T10) the monostable circuit 88, upon resuming its normal state, deenergizes via "or" gate 79 the output R of the monostable circuit 61, whereby through the input 13 of the reader 11 an advance signal AV is produced for the tape, which therefore advances one step to bring in front of the reader the next following character, which, as already stated, is the first digit of the positional order pertaining to the axis X. Assuming said digit is 7, output K7 of decoder 14, that is, input bar B7 of the adder 22, is thus energized.

When (instant T11) the monostable multivibrator 61 by reverting to its normal state reestablishes the signal R, via "or" gate 84 a signal X is produced also in this case, because the output of the binary memory MIX continues to be energized. Therefore the digit counter 23 advances one step, thus energizing output C2 and therefore energizing the relay C2X. As a consequence, this relay closes the contact C2X3 for selecting the switch 36 on which the operator had set up the first digit of the absolute coordinate X of the relative zero point, and simultaneously closes in the memory 15 the switch C2X1 for selecting the second column of the relay matrix 62X (FIG. 2), that is, it selects the column in which the first digit of the corrected positional order pertaining to axis X shall be set up. Therefore, assuming said first digit of the absolute coordinate X of the relative zero point is 5, input bar D5 and input bar B7 of the adder 22 will be simultaneously energized, whereby adder 22 will energize its output line U2. Moreover inside adder 22 a decimal carry will be thus produced. As the output line U2 of the adder 22 is energized, contact N2 of the fifth row of the relay matrix 62X (FIG. 2) is closed. In the meantime, the beginning of said signal X (instant T11) has started the chain of monostable circuits 87, 88, whereby, when the monostable circuit 88 produces the signal IM (instant T12), relay RC is energized. Therefore contact MS is closed to energize in the setting matrix 62X the relay belonging to the fifth row and to the second column. As a consequence, also the relay belonging to the fifth row and to the second column of the storage matrix BX is energized and remains energized to indicate that the first digit of the absolute coordinate X is equal to 2, so as to store said digit 2 for controlling the digital-to-analog converter 16X. At the end of the signal IM (instant T13) the multivibrator 88 by reverting to its normal state causes, via "or" gate 79, the output R of the monostable multivibrator 61 to be deenergized, and thus produces via the input 13 of the reader 11 an advance signal AV for the tape. Therefore reader 11 reads the second digit of the relative coordinate X. This digit is stored in the third column of the matrix 63X of the memory 15 after having been added to the second digit of the absolute coordinate of the relative zero point previously set up on switch 37. In a similar manner the following digits of the positional order pertaining to axis X are read on the tape 12, corrected in the adder 22 and stored in the successive columns of the matrix 63X.

After the last one of said digits, the address character IY heading the positional order pertaining to axis Y is read on the tape.

More particularly, at the end of signal IM (instant T14) which times the storing of the fifth (last) digit of the coordinate X, a tape advance signal AV is produced as usually while the output R of the monostable circuit 61 is deenergized. Therefore the tape advances one step and stops to bring in front of the reader the next following character, which is said character IY. Upon reading said character IY on the tape, the output IY of decoder 14 is energized, whereby via "or" gate 75 a signal KS is produced to indicate that the character being now read is a special character instead of a numeric or sign character. Said signal KS zeroizes the digit counter 23, so that none of its outputs C1 to C7 is energized. Moreover, when, thereafter (instant T16) the monostable circuit 61 reverts to its normal state, said signal KS by energizing output 56 of "and" gate 76 opens gate 53, where by signal IY is stored in the binary memory MIY. Since that moment, cancellation of matrix 63Y, reading on the tape the coordinate Y and storing said coordinate in the matrix 63X of the memory 15 occur (from instant T16 to instant T17) in a manner similar to the corresponding operations performed for the coordinate X from the instant T6 to the instant T14, as previously described.

At said instant T17, that is, at the end of the signal IM which times the storing of the fifth (last) digit of the coordinate Y, a tape advance signal AV is produced as usually, whereby the reader 11 reads the next following character, which, as previously stated, is the end-of-sequence character CR. Upon reading said character CR, output CR of decoder 14 is energized (instant T18), whereby via "or" gate 75 a signal KS is produced to indicate that the character being now read is a special character. Said signal KS zeroizes the digit counter 23, so that none of its outputs C1 to C7 is energized. Moreover, when, thereafter (instant T19) the monostable circuit 61 reverts to its normal state, said signal KS by energizing the output 56 of the "and" circuit 76 opens gate 55, through which the signal CR is thus stored in the binary memory MCR. Unlike the other special characters, character CR does not act on monostable circuit 61 and therefore it produces no advance signal AV for the tape. If at the same time the checking circuit 72 of the memory 15 produces signal CS indicating that setting up the coordinates X and Y in the memory 15 has been completed, a gate 25 is opened to feed said signal CR to energize the servomotors 18X and 18Y. Therefore the servomotors, which had been inoperative until this moment due to absence of said signal CR, start displacing the movable part of the machine according to the positional orders at present stored in the memory 15. Displacement continues until, upon reducing to zero both error signals outgoing from the position measuring transformers 17X and 17Y, that is, upon completion of the positioning operation, the circuit 21 responsive to said error signal being reduced to zero produces on output 24 a signal for starting the operation to be performed in the position just reached. After completion of this operation, the tape is either manually or automatically restarted for reading the next following sequence of positional orders.

On the contrary, should said signal CS have been absent, that is, should the coordinates X and Y have failed to be completely set up, gate 25 would have remained closed and thus the servomotors would have not been energized.

The manual operation of the device will now be briefly described. According to this mode of operation, the tape reader 11 remains inoperative, whereby all outputs of the decoder 14 remain deenergized. Moreover the switch 47 is in the position opposite to the position shown in FIG. 1a and contact 46 is closed to enable operation of the manually operable switches of the group 48.

The operator, as before the automatic operation, sets up on the switches of the group 49 the absolute coordinates of the relative zero point. Moreover in this case he sets up on the switch of the group 48 the positional orders pertaining to the axes X and Y.

Thereafter the operator pushes the start button ST. Therefore a signal is sent on line 57 via switch 47. It is thus apparent that pushing the button ST during the manual operation simulates reading an address character IX on the tape, whereas in the automatic operation simulates reading a non significant character TF.

Therefore, during the manual operation, beginning from actuation of start button ST, storing the coordinate X in the memory 15 is performed in a manner quite similar to storing the same coordinate during the automatic operation beginning from instant T6 (FIG. 3) until instant T14, apart from the difference that in the present case during each signal IM timing the setting up of the digits in the matrix 62X, the digits entered into the memory 15 via inputs B0 to B9 of adder 22 are the digits set up on the switch of group 48 instead of the digits read on the tape. More particularly, at the instant T8 the counter 23 will close the contact C1X2 for selecting the switch 64, on which the sign of the coordinate X has been set up, whereby either the input UN or the input UP of the memory 15 will be energized, depending on whether the sign is negative or positive, whereas at the corresponding instant T8 of the automatic operation said inputs were fed by the outputs SN, SP respectively, of decoder 14.

Similarly, at the instant T11 the counter 23 closes contact C2X2 for selecting the switch 26 on which the first digit of the coordinate X has been set up, whereby one out of the bars B0 to B9 corresponding to the value of said digit will be energized, whereas at the corresponding instant T11 of the automatic operation said bar was fed by the corresponding output K0 to K9 of decoder 14, and so on for the following digits.

After storing the fifth (last) digit of the coordinate X (instant T14), the monostable circuit 88 by reverting to its normal state energizes as usually the monostable circuit 61. Since in the manual operation the tape reader is inoperative, signal KS which at instant T15 zeroized the digit counter 23 is now absent. Moreover, since said signal KS is absent, when the monostable circuit 61 reverts to its normal state (instant T16) on the output of the "and" gate 84, contrary to the automatic operation, a seventh signal X is produced to advance counter 23 one step more, to thus energize the output C7 which during the automatic operation was never energized.

Therefore, since said output C7 is energized during said signal X, the output of an "and" gate 31 is energized to energize line 58. It is thus apparent that during the manual operation the completion of the storing of the coordinate X in the memory 15 automatically causes line 58 to be energized, so as to simulate the reading of an address character IY on the tape.

Therefore, from the instant in which said line 58 is energized the coordinate Y set up on the switches 65, 31, 32, 33, 34, 35 of group 48 begins to be stored in the memory 15. This storing operation is similar to the corresponding operation performed in the automatic mode from instant T16 to instant T17 (FIG. 3).

After storing the fifth (last) digit of the coordinate Y (instant T17), and after the monostable circuit 61 has reverted to its normal state (instant T19) a seventh signal Y is produced because signal KS is absent as the tape reader is inoperative. Said signal Y advances the counter 23 to energize output C7. Therefore via "and" gate 90 line 60 is energized. It is thus apparent that during the manual operation the end of the storing of the coordinate Y in the memory 15 causes line 60 to be automatically energized, so as to simulate reading an end-of-sequence character CR on the tape.

The signal CR thus simulated is stored in the binary memory MCR like in the automatic operation and via gate 25 makes the servomotors 18X and 18Y operative.

As previously stated, preliminary to both automatic and manual operation the absolute coordinates of the relative zero point must be set up on the switches of group 49. The workpiece, which is mounted for instance on the movable part of the machine, will in general bear traced on its surface the reference point (relative zero), which has been considered as the reference point in preparing the program recorded on the tape 11. To determine said absolute coordinates of the relative zero point, that is the correcting constant to be added to the relative coordinates supplied by the tape in order to make coincident the absolute and the relative zero points, all the switches of the group 48 are zeroized after having set the contact 46 and the switch 47 in the "manual mode" position. Then, after having set up on the switches of the group 49 an approximate value of said absolute coordinates of the relative zero point, the start button ST is pushed, whereby the servo-system positions the movable part of the machine into the position represented by said coordinates set up on the switches of the group 49. If the absolute reference point and the relative reference point do not coincide after this tentative positioning, the values set up on the switches of the group 49 are corrected, then the start button ST is pushed again to start a new tentative positioning operation, and so on.

The modification to be made in the described device for making it adapted to control the positioning along three or more axes are obvious to those skilled in the art.

From the foregoing description it will be understood that many changes may be made in the above device, and different embodiments of the invention could be made without departing from the limits thereof.

It is, therefore, intended that all matter contained in the above description or shown in the accompanying drawings shall be interpreted as illustrative, and not in a limiting sense.

What we claim is:

1. In a control device for positioning a movable part of a machine-tool and similar equipments:
   (a) a servosystem responsive to positional orders applied thereto for moving said movable part according to said applied positional orders with respect to an absolute reference point,
   (b) a program device operable for supplying digital positional orders each one representing with respect to a relative reference point a position of said movable part,
   (c) a register for storing and supplying a digital correcting constant representing the position of said relative reference point with respect to said absolute reference point,
   (d) a digital adder jointly fed by said program device and by said register and feeding on output said positional orders corrected by the addition of said correcting constant to said servosystem,
   (e) and means operable instead of said program device, and including means for manually modifying the contents of said register, for positioning said movable part by means of said servosystem to coincidence between the absolute and relative reference points in order to determine said correcting constant.

2. In a control device for positioning a movable part of a machine-tool and similar equipments along two or more axes,
   (a) a servo-system responsive to positional orders applied thereto for moving said movable part according to said applied positional orders with respect to an absolute reference point,
   (b) a program record reader operable for supplying successive positional orders each one representing with respect to a relative reference point a position of said movable part, and for supplying address signals identifying each one of said supplied positional orders as pertaining to one of said axes,
   (c) a group of manually operable setting means for setting up concurrently for all said axes positional orders with respect to said relative reference point,
   (d) means operable instead of said reader for scanning said setting means to sequentially supply said set up positional orders,
   (e) a register for storing and supplying a digital correcting constant representing the position of said relative reference point with respect to said absolute reference point,
   (f) a digital adder jointly fed by said reader and said scanning means and by said register and feeding on output said positional orders corrected by the addition of said correcting constant to said servo-system,
   (g) means operable instead of said reader and said scanning means, and including means for manually modifying the contents of said register, for positioning said movable part by means of said servo-system to coincidence between the absolute and relative reference points,
   (h) and means operative concurrently with said scanning means for generating automatically for said set up positional orders the relevant address signals.

References Cited

UNITED STATES PATENTS 3,284,618 11/1966 Gotz _____ 235—151.11
3,348,208 10/1967 Rosener _____ 235—151.11 X MARTIN P. HARTMAN, *Primary Examiner.*

U.S. Cl. X.R.

318—18